United States Patent [19]

Sasaki

[11] Patent Number: 4,651,601

[45] Date of Patent: Mar. 24, 1987

[54] DEVICE FOR PREVENTING A COLLISION BETWEEN A WORK HOLDER AND A TOOL IN NUMERICAL CONTROL FOR A TURRET PUNCH PRESS

[75] Inventor: Takao Sasaki, Hachioji, Japan

[73] Assignee: Fanuc Ltd, Minamitsuru, Japan

[21] Appl. No.: 826,491

[22] PCT Filed: May 15, 1985

[86] PCT No.: PCT/JP85/00269

§ 371 Date: Jan. 23, 1986

§ 102(e) Date: Jan. 23, 1986

[87] PCT Pub. No.: WO85/05298

PCT Pub. Date: Dec. 5, 1985

[30] Foreign Application Priority Data

May 24, 1984 [JP] Japan .................. 59-105521

[51] Int. Cl.$^4$ .............. B26D 7/01; B26D 7/24
[52] U.S. Cl. .................... 83/13; 83/58; 83/62.1; 83/71; 72/1; 364/475
[58] Field of Search .......... 83/13, 58, 62, 62.1, 83/71; 72/1, 28; 364/475

[56] References Cited

U.S. PATENT DOCUMENTS 3,348,440 10/1967 Jensen .................. 83/62 X
3,603,187 9/1971 Bredow ................... 83/62
4,589,317 5/1986 Kawano ............... 83/62 X

FOREIGN PATENT DOCUMENTS 112103 7/1983 Japan .
144600 8/1984 Japan .

Primary Examiner—Frank T. Yost
Attorney, Agent, or Firm—Staas & Halsey

[57] ABSTRACT

A device for preventing a collision between a work holder (20) and a tool in numerical control equipment for a turret punch press. A region occupied by the work holder (20) in a mechanical coordinate system, is stored in a work holder region storing memory (4), and the sizes of a plurality of tool posts of a turret (24), or the sizes of tools received in the tool posts, are stored in a tool post shape storing memory (4). At the time of tool selection, a punching inhibit computing circuit (1) computes a punching inhibit region for a selected one of the tools on the basis of the stored contents of the work holder region storing memory (4) and the tool post shape storing memory (4). Immediately before the execution of a punch command, a collision preventing circuit (1) checks whether the position of the selected tool is within the punching inhibit region or not, and if so, it stops the operation of the machine.

3 Claims, 5 Drawing Figures

FIG. 3
| | | |
|---|---|---|
| dw | T01 → R01 | $X_1 - R01 \leq 22ap \leq X_2 + R21$ |
| dL | T02 → R02 | $Y_1 - R01 \leq 22ap \leq Y_2 + R21$ |
| $l_1$ | T03 → R03 | $X_3 - R01 \leq 22bp \leq X_4 + R21$ |
| $l_2$ | . | $Y_1 - R01 \leq 22bp \leq Y_2 + R21$ |
| $X_1 \leq 22a \leq X_2$ | . | |
| $Y_1 \leq 22a \leq Y_2$ | . | |
| $X_3 \leq 22b \leq X_4$ | | |
| $Y_1 \leq 22b \leq Y_2$ | T24 → R24 | |
FIG. 4
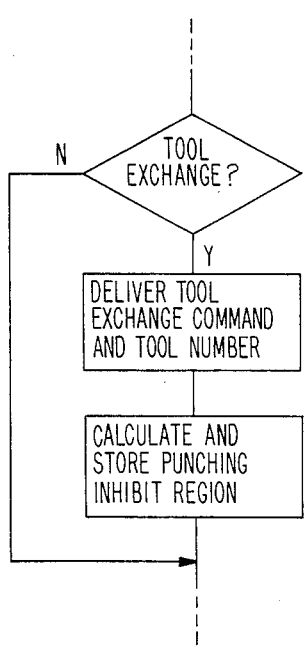
FIG. 5
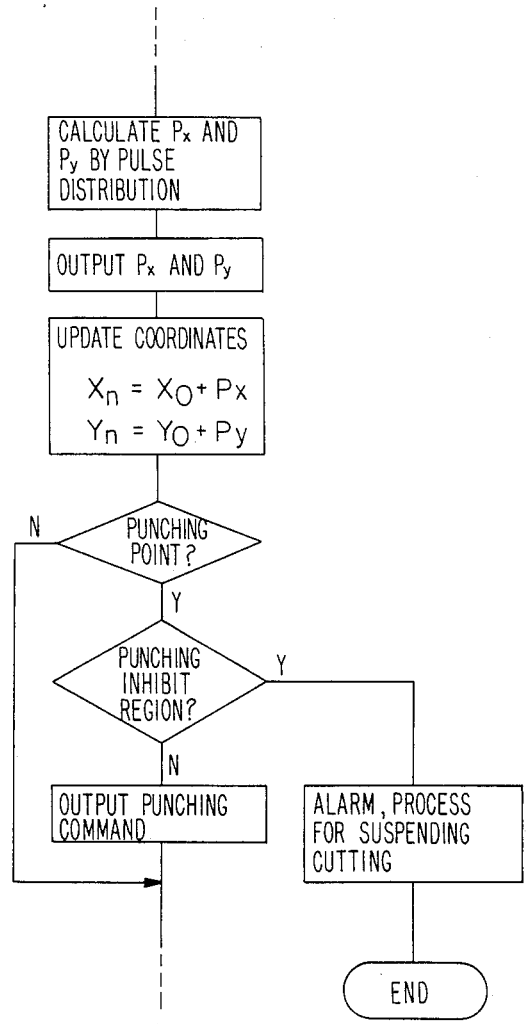

DEVICE FOR PREVENTING A COLLISION BETWEEN A WORK HOLDER AND A TOOL IN NUMERICAL CONTROL FOR A TURRET PUNCH PRESS

BACKGROUND OF THE INVENTION

The present invention relates to a work holder-tool collision preventing device for use with numerical control equipment for a turret punch press, with which it is possible to prevent a work holder holding a workpiece and a tool from being broken down by a collision therebetween which is caused by an accidental punching operation of the tool to the work holder due to a program error or the like.

In conventional devices of this kind it is customary that a certain region directly specified by a limit switch, parameter setting or a command from a command tape is set up as an axis displacement inhibit region, thereby preventing a tool from colliding against a work holder due to a program error or the like.

However, in the case of using the limit switch, much time is needed for providing the switch and associated works. Also in the cases of the parameter setting and tape command, it is necessary for the operator to establish the inhibit region in advance by computations consuming relatively much time. Moreover, the sizes of tools which are mounted on a turret vary greatly, so that in order to minimize the inhibit region and enlarge a punching region, it is desirable to modify the inhibit region according to the size of the tool selected. However, this cannot easily be done in the case of using the limit switch and in the cases of the parameter setting and tape command, the burden on the operator will increase and a large storage capacity will be needed.

SUMMARY OF THE INVENTION

The present invention offers a solution to such defects of the prior art and has for its object to permit setting of an inhibit region corresponding to the tool being selected, by a simple operation and with a small storage capacity.

The present invention is directed to a device for preventing a selected tool on the turret from colliding with a work holder holding a workpiece for a turret punch press. The device of the present invention is provided with a work holder region storing means for storing a region occupied by the work holder in a mechanical coordinate system; a tool post shape storing means for storing the sizes of a plurality of tool posts of the turret; a punching inhibit region computing means, so that at the time of tool selection, the size of the tool post in which the selected tool is housed is read out of the tool post shape storing means and a punching inhibit region for the tool is calculated from the read-out information and the stored information of the work holder region storing means; a punching inhibit region storing means for storing the punching region; and a collision preventing means so that immediately before the execution of a punch command, it is detected whether the position of the tool is within the punching inhibit region or not and, if so, the operation of the machine is stopped and an alarm signal is generated.

With the device of the present invention, once data necessary for specifying the region occupied by the work holder in the mechanical system and information on the size of each tool post of the turret are set by the operator in a memory, an inhibit region corresponding to the size of the tool selected, is automatically set up. Accordingly, the inhibit region corresponding to the tool selected can be established by a very simple operation. Furthermore, since the inhibit region is computed and stored when the tool is selected, the storage capacity needed is small.

BRIEF DESCRIPTION OF THE DRAWINGS

FIG. 3 is a diagram for explaining the stored contents of a RAM 4; and

FIGS. 4 and 5 are flowcharts for describing the operation of the present invention.

DESCRIPTION OF THE PREFERRED EMBODIMENT

Figure 1:
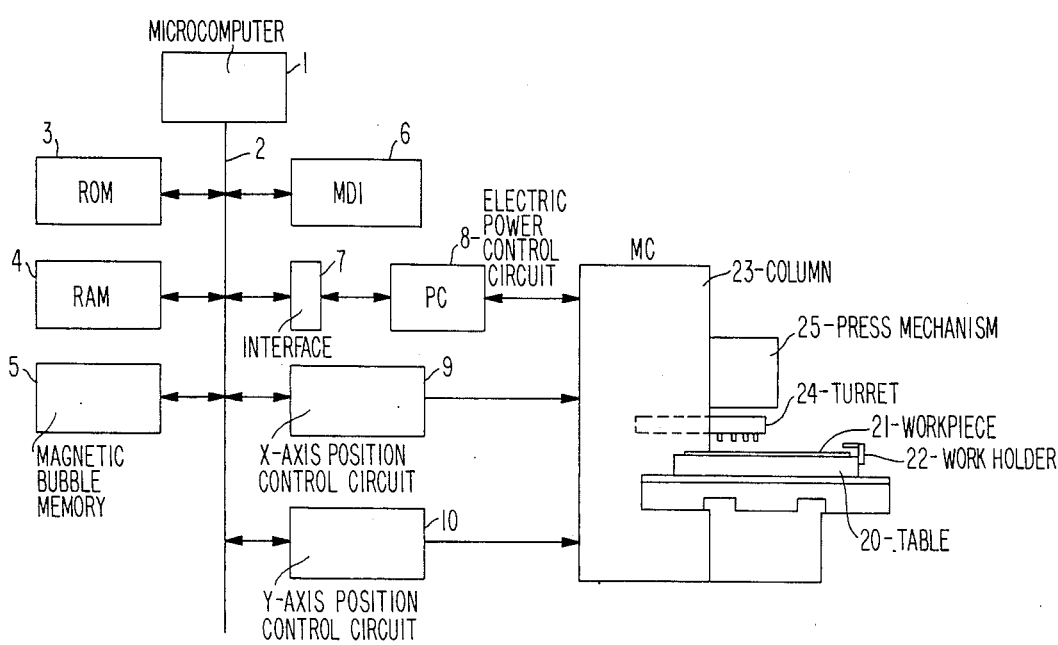
FIG. 1 is a block diagram of the arrangement of a numerically controlled machine tool provided with the collision preventing device of the present invention.

FIG. 1 is a diagram illustrating the arrangement of a numerically controlled machine tool equipped with the collision preventing device of the present invention, which comprises numerical control equipment NC and a turret punch press machine tool MC.

The numerical control equipment NC has a microcomputer 1 and peripheral circuits interconnected via a bus 2. A ROM 3 is a memory for storing a program or the like necessary for the execution of predetermined processing by the microcomputer 1, and a RAM 4 is a memory which has areas for storing and calculating parameters such as data on the shapes of a work holder and tool posts and so forth. A magnetic bubble memory 5 is a memory for storing an NC command program. Reference numeral 6 indicates a manual data input device (MDI), which has various keys. The data on the shapes of the work holder and the tool posts are entered via the MDI 6. Reference numeral 7 designates an interface between the numerical control equipment NC and an electric power control circuit 8. Various information such as a punch command, a tool exchange command including the number of a tool to be exchanged, an alarm signal and so on for the turret punch press machine tool MC is sent via the interface 7 to the electric power control circuit 8, which performs control for a tool exchange through sequence control in a known manner. Reference numeral 9 identifies a known X-axis position control circuit provided with an error register, a servo amplifier, etc. and 10 a Y-axis position control circuit. The output of the X-axis position control circuit 9 is connected to an X-axis motor (not shown) which shifts a table 20 of the machine tool MC in the X-axis direction, and the Y-axis postion control circuit 10 is connected to a Y-axis motor (not shown) which drives the table 20 in the Y-axis direction.

The turret punch press machine tool MC has the table 20 movable by the X-axis and the Y-axis motor to a desired position in the horizontal direction, a work holder 22 for fixing a workpiece 21, such as a steel plate, on the table 20 and a turret 24 mounted on a column 23 in a manner to be rotatable in a horizontal plane. The turret 24 has a plurality of tool posts for receiving various tools. Provided above the turret 24 is a press mechanism 25 which responds to a punch command to strike, from above, a tool held in a selected one of the tool posts of the turret 24. Usually two such work holders 22 are employed, by which the workpiece 21 placed on the table 20 is pressed against it from above.

Figure 2:
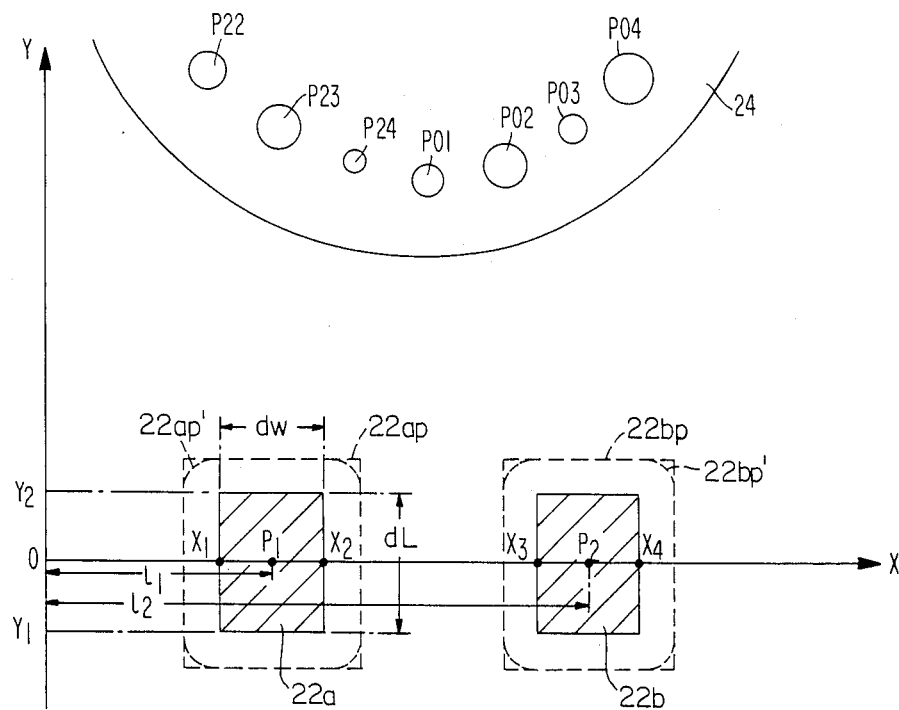
FIG. 2 is a diagram for explaining a work holder and a punching inhibit region.

Provided that two work holders 22a and 22b occupy, for example, the hatched regions shown in FIG. 2, data specifying each of these regions is set by preprocessing, as a parameter, in a certain area of the RAM 4 via the MDI 6. When the two work holders 22a and 22b are identical in shape, for instance, their length dL and width dw and X-axis coordinate values $l_1$ and $l_2$ of their centers of gravity $P_1$ and $P_2$ are used as the data. When the centers of gravity $P_1$ and $P_2$ are not on the X-axis unlike in the illustrated example, Y-axis coordinate values of the centers of gravity $P_1$ and $P_2$ are also input.

Upon completion of inputting this data, the microcomputer 1 computes from the data the hatched regions occupied by the work holders 22a and 22b, and then stores them in the memory 4. FIG. 3 is a diagram showing an example of the stored contents of the RAM 4, wherein are stored the region of the work holder 22a, $X_1 \leq 22a \leq X_2$, $Y_1 \leq 22a \leq Y_2$, and the region of the work holder 22b, $X_3 \leq 22b \leq X_4$, $Y_1 \leq 22b \leq Y_2$, calculated from the data dw, dL, $l_1$ and $l_2$.

Moreover, in preprocessing, the radii R01 to R24 of tool posts P01 to P24 of the turret 24 are detected and introduced via the MDI 6 corresponding to tool numbers T01 to T24 which are received in the tool posts, and they are stored as parameters in the RAM 4, as depicted in FIG. 3.

In the case of starting the machining operation after storing such data in the RAM 4, when a tool exchange command is carried out, the microcomputer 1 sends the tool number and the tool exchange command via the interface 7 to the electric power control circuit 8, causing it to control a tool select operation. At the same time, the microcomputer 1 calculates, from the work holder region data and the tool post shape data corresponding to the tool number of a selected tool (both stored in the RAM 4), a punching inhibit region of the tool and stores it in the RAM 4, as shown in FIG. 4. For instance, when the radius of the tool post of the selected tool is R01, a region 22ap which is represented by $X_1 - R01 \leq 22ap \leq X_2 + R01$, $Y_1 - R01 \leq 22ap \leq Y_2 + R01$ is computed as a punching inhibit region for the work holder 22a and a region 22bp which is represented by $X_3 - R01 \leq 22bp \leq X_4 + R01$, $Y_1 - R01 \leq 22bp \leq Y_2 + R01$ is computed as an punching inhibit region for the work holder 22b. Incidentally, it would be more appropriate to set up the punching inhibit regions within regions (indicated by 22ap' and 22bp' in FIG. 2) spaced R01 apart from the work holders 22a and 22b, but a complex computing process is required.

FIG. 5 is a flowchart showing the contents of a process which is executed by the microcomputer 1 in response to a one-block command.

As is known in the art, the microcomputer 1 interprets an NC command program, block by block, computes X-axis and Y-axis command values Px and Py, by way of pulse distribution, from a given amount and speed of movement of the table, and provides them to the X-axis and Y-axis position control circuits 9 and 10, respectively. Next, the current command values Px and Py are added to an accumulated value $X_0$ of the previous command values, thereby updating the coordinate position of the table. Next, it is checked whether the table has reached the punching position. If not, the table moving process is continued. If the punching position has been reached, it is checked whether the current coordinate position (the center position of the tool) is within the punching inhibit region of the selected tool set in the RAM 4. If not, a punch command is provided via the interface 7 to the electric power control circuit 8 to cause it to activate the press mechanism 25, performing a punching operation. When the center position of the tool (which is the same as the updated coordinate position) lies within the punching inhibit region, an alarm signal is sent via the interface 7 to the electric power control circuit 8, by which an alarm lamp or buzzer mounted on a panel of the machine or the like is lighted or sounded, and a process for suspending the machining operation is carried out.

While in the above embodiment the length dL and width dw of each of the work holders 22a and 22b and the X-axis coordinate values $l_1$ and $l_2$ of their centers of gravity are used as the data for specifying their shapes, it is also possible, of course, to specify their shapes by using other data. Provision may also be made for computing the region occupied by the work holder and the punching inhibit region at the time of a command for selection of a tool, instead of computing the region occupied by the work holder and storing it in the RAM 4 prior to the start of the machining operation. It is also possible to set the inner diameter of each tool post. Moreover, for strictly setting the range of the inhibit region, it is desirable to compute it from the maximum diameter of the tool, but it is cumbersome to measure the maximum diameters of tools having special shapes other than round and square ones. The foregoing embodiment is adapted to set the size of each tool post, noting that it is always somewhat larger than the maximum diameter of the tool. Also in the cases of tools with special shapes, however, it is all right to measure and set their maximum diameters.

As described above, according to the present invention, once data necessary for specifying the region occupied by the work holder and information on the size of each tool post of the turret or the size of each tool are set in a memory, an inhibit region corresponding to the tool to be selected, is automatically set. Accordingly, an inhibit region well suited to the selected tool can be set by a very simple operation. Furthermore, since the inhibit region corresponding to the selected tool is computed and stored when selecting the tool, the storage capacity used may be small. Besides, when the inhibit region is set as an axis displacement inhibit region, some limitations may be imposed on the path from a certain machining point to the next. In the present invention, however, since the inhibit region is set as a punching inhibit region, not as the axis displacement inhibit region, such a disadvantage will not be encountered.

What is claimed is:

1. A device for preventing a collision between a work holder and a tool in numerical control equipment for a turret punch press, comprising:
   work holder region storing means for storing data representing a region occupied by the work holder in a mechanical coordinate system;
   tool post shape storing means for storing data representing the sizes of a plurality of tool posts of a turret or the sizes of tools received in the tool posts;
   punching inhibit region computing means for reading out the size of the tool post receiving the selected tool or the size of the selected tool from the tool post shape storing means at the time of tool selection, and for computing a punching inhibit region for the selected tool from the read-out information and the stored information of said work holder region storing means;

punching inhibit region storing means for storing the punching inhibit region; and collision preventing means for checking whether the position of the selected tool is within the punching inhibit region or not immediately before the execution of a punch command, and for stopping the operation of the machine and generating an alarm signal if the position of the selected tool is within the punching inhibit region.

2. A device for preventing a collision between a work holder and a tool in numerical control equipment for a turret punch press, comprising:

means for storing first data representing a region occupied by the work holder and second data representing the shapes of tool posts; and a central processing unit for computing a punching inhibit region for a selected tool at the time of tool selection based on the first and second data and for checking whether the position of the selected tool is within the punching inhibit region or not immediately before the execution of a punch command, said central processing unit stopping the operation of the turret punch press and generating an alarm signal if the position of the selected tool is within the punching inhibit region.

3. A method for preventing a collision between a work holder and a tool in numerical control equipment for a turret punch press, comprising the steps of:

(a) storing first data representing a region occupied by the work holder;

(b) storing second data representing tool post shapes;

(c) automatically computing a punching inhibit region for a selected tool based on the first and second data at the time of tool selection;

(d) checking whether the position of the selected tool is within the punching inhibit region or not immediately before the execution of a punch command; and (e) stopping the operation of the turret punch press and generating an alarm signal if the position of the selected tool is within the punch inhibit region.

* * * * *